US010738201B2

United States Patent
Yin et al.

(10) Patent No.: US 10,738,201 B2
(45) Date of Patent: Aug. 11, 2020

(54) ANTI-SOILING COMPOSITIONS COMPRISING SILICA NANOPARTICLES AND FUNCTIONAL SILANE COMPOUNDS AND COATED ARTICLES THEREOF

(71) Applicant: 3M INNOVATIVE PROPERTIES COMPANY, St. Paul, MN (US)

(72) Inventors: Long Yin, Shanghai (CN); Zhigang Yu, Shanghai (CN); Naiyong Jing, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 234 days.

(21) Appl. No.: 15/747,053

(22) PCT Filed: Jul. 29, 2015

(86) PCT No.: PCT/CN2015/085383
§ 371 (c)(1),
(2) Date: Jan. 23, 2018

(87) PCT Pub. No.: WO2017/015885
PCT Pub. Date: Feb. 2, 2017

(65) Prior Publication Data
US 2018/0362780 A1    Dec. 20, 2018

(51) Int. Cl.
| | | |
|---|---|---|
| *C09D 7/61* | (2018.01) |
| *C09D 5/16* | (2006.01) |
| *C09D 1/00* | (2006.01) |
| *C09D 7/65* | (2018.01) |
| *C09D 4/00* | (2006.01) |
| *C03C 17/00* | (2006.01) |
| *C08K 3/34* | (2006.01) |
| *C08K 3/36* | (2006.01) |
| *C08G 59/20* | (2006.01) |
| *C08K 5/5419* | (2006.01) |

(52) U.S. Cl.
CPC .............. *C09D 7/61* (2018.01); *C03C 17/007* (2013.01); *C03C 17/008* (2013.01); *C08G 59/20* (2013.01); *C08K 3/36* (2013.01); *C08K 5/5419* (2013.01); *C09D 1/00* (2013.01); *C09D 5/16* (2013.01); *C09D 7/65* (2018.01); *C03C 2217/445* (2013.01); *C03C 2217/478* (2013.01); *C03C 2217/75* (2013.01)

(58) Field of Classification Search
None
See application file for complete search history.

(56) References Cited

U.S. PATENT DOCUMENTS

| | | |
|---|---|---|
| 6,673,433 B1 | 1/2004 | Saeki |
| 9,206,335 B2 | 12/2015 | Hager et al. |
| 2010/0096114 A1 | 4/2010 | Yoshida |
| 2012/0273000 A1 | 11/2012 | Jing |
| 2015/0175807 A1* | 6/2015 | Jing ...................... C09D 5/002 428/412 |

FOREIGN PATENT DOCUMENTS

| | | |
|---|---|---|
| CN | 104540900 | 4/2015 |
| WO | WO 2009-140482 | 11/2009 |
| WO | WO 2011-142956 | 11/2011 |
| WO | WO 2012-047867 | 4/2012 |
| WO | WO 2012-047872 | 4/2012 |
| WO | WO 2012-047877 | 4/2012 |
| WO | WO 2014-008383 | 1/2014 |
| WO | WO 2015-088808 | 6/2015 |
| WO | WO 2015-119905 | 8/2015 |
| WO | WO 2016-025292 | 2/2016 |

OTHER PUBLICATIONS

Search Report for CN Appl. No. 201580081981X, dated Aug. 13, 2019, 2 pp.
Gelest, Inc.Information Sheet,2006, 2 pages.
International Search report for PCT International application No. PCT/CN2015/085383 dated Apr. 11, 2016, 5 pages.
Supplementary EP Search Report for EP15899237, dated Mar. 11, 2019, 2 pp.

* cited by examiner

*Primary Examiner* — Sheeba Ahmed
(74) *Attorney, Agent, or Firm* — Janet A. Kling

(57) ABSTRACT

Provided is a coated article comprising a substrate and a dried coating which comprises a first set of spherical silica nanoparticles having an average diameter of less than 20 nm and a second set of spherical silica nanoparticles having an average diameter of 20 nm to 120 nm. The alkoxy silane compound comprises an epoxy functional group or a carboxylic acid functional group. Also provided is a coating composition comprising an acidic aqueous dispersion which comprises the described first and second set of spherical silica nanoparticles and silane compound.

13 Claims, No Drawings

ANTI-SOILING COMPOSITIONS COMPRISING SILICA NANOPARTICLES AND FUNCTIONAL SILANE COMPOUNDS AND COATED ARTICLES THEREOF

CROSS REFERENCE TO RELATED APPLICATIONS

This application is a national stage filing under 35 U.S.C. 371 of PCT/CN2015/085383, filed Jul. 29, 2015, the disclosure of which is incorporated by reference in its/their entirety herein.

SUMMARY

In one embodiment, a coated article is described comprising a (e.g. glass) substrate and a dried coating comprising a first set of spherical silica nanoparticles having an average diameter of less than 20 nm and a second set of spherical silica nanoparticles having an average diameter of 20 nm to 120 nm. The alkoxy silane compound comprises an epoxy functional group or a carboxylic acid functional group with the proviso that the compound is not the conjugate acid of carboxyethylsilane triol sodium salt or N-(trimethoxysilylpropyl)ethylene diamine triacetic acid trisodium salt.

The alkoxy silane compound typically comprises a single terminal alkoxy silane group and a single terminal functional group selected from carboxylic acid or epoxy.

In some embodiments, the alkoxy silane compound is a carboxylic acid compound prepared by reacting a dicarboxylic acid or anhydride thereof with an acid reactive alkoxy silane compound. The acid reactive alkoxy silane is typically an amine-functional or hydroxyl-functional alkoxy silane compound.

Also described is a coating composition comprising an acidic aqueous dispersion comprising a first set of spherical silica nanoparticles having an average diameter of less than 20 nm; a second set of spherical silica nanoparticles having an average diameter of 20 nm to 120 nm; and a silane compound, as previously described.

DETAILED DESCRIPTION

In some embodiments, coating compositions are described comprising an aqueous dispersion of (e.g. silica) nanoparticles and alkoxy silane compounds that comprise a single terminal alkoxy silane group and a single terminal functional group. In typical embodiments, the functional group is a carboxylic acid group or an epoxy group. In some embodiments, the molecular weight of the alkoxy silane compound is less than 500 or 450 g/mole. In some embodiment, the molecular weight is at least 175 or 200 g/mole.

In some embodiments, the alkoxy silane compound comprises an epoxy functional group such as epoxycyclohexyl, glycidyl, and glycidyloxy.

Suitable epoxy functional alkoxy silane compounds include for example those having the following general formulas:

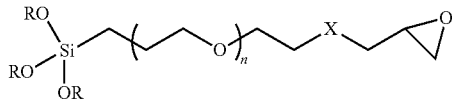

-continued

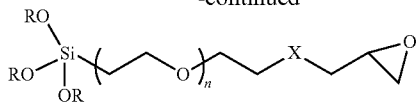

wherein n ranges from 0-10, X is $CH_2$, O, S or NHCOR, and R is a $C_1$-$C_4$ alkyl group.

In some embodiments, R is methyl and/or ethyl, n is 1, and X is $CH_2$.

Commercially available epoxy functional alkoxy silanes compounds include, but are not limited to (3-glycidoxypropyl) trimethoxysilane ("GPTMS"); (3-glycidoxypropyl) triethoxysilane; and mixtures thereof.

In other embodiments, the silane comprises a carboxylic acid functional group. The carboxylic acid functional silane compound is typically prepared by reacting a carboxylic acid or anhydride thereof with an acid reactive silane compound. However, the carboxylic acid functional silane compound is not carboxyethylsilane triol sodium salt or N-(trimethoxysilylpropyl)ethylene diamine triacetic acid trisodium salt or the conjugate acids thereof. In some embodiments, the alkoxy silane compound is free of ethylenic unsaturation (or in other words —HC=CH— bonds) such as in the case of triethoxysilylpropylmaleamic acid.

In typical embodiments, the carboxylic acid functional silane compound is prepared by reacting a dicarboxylic acid or anhydride thereof with an acid reactive alkoxy silane compound.

Suitable dicarboxylic acids typically have the following formula:

wherein m ranges from 1-12.

In some embodiments, m is at least 2 as in the case of succinic acid. In typical embodiments, m is no greater than 8, such as in the case of sebacic acid. In some embodiments, m is no greater than 4, such as in the case of adipic acid.

Suitable dicarboxylic acid anhydrides generally have the following formula:

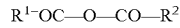

wherein $R^1$ and $R^2$ are typically independently alkyl groups. In some embodiments, the sum of $R^1$ and $R^2$ is no greater than 12, 10, 8, 6, 4 or 2 carbon atoms.

In some embodiments, $R^1$ and $R^2$ may form a cyclic aliphatic group such as in the case of succinic anhydride, depicted as follows:

In some embodiments, the carboxylic acid functional silane compound is prepared by reacting a carboxylic acid with an alkoxy silane compound comprising an amine terminal group such as —NH—$CH_2$—$CH_2$—$NR^2R^3$ or —$NR^2R^3$ with $R^2$ and $R^3$ independently selected from the group consisting of H, alkyl, phenyl, benzyl, cyclopentyl and cyclohexyl.

Suitable alkoxy silane compounds having amine functionality include, but are not limited to amino-substituted organosilane ester or ester equivalent that bear on the silicon atom at least one, and preferably 2 or 3 ester or ester equivalent groups. Ester equivalents are known to those skilled in the art and include compounds such as silane amides (RNR'Si), silane alkanoates (RC(O)OSi), Si—O—Si, SiN(R)—Si, SiSR and RCONR'Si compounds that are thermally and/or catalytically displaceable by R"OH. R and R' are independently chosen and can include hydrogen, alkyl, arylalkyl, alkenyl, alkynyl, cycloalkyl, and substituted analogs such as alkoxyalkyl, aminoalkyl, and alkylaminoalkyl. R" may be the same as R and R' except it may not be H. These ester equivalents may also be cyclic such as those derived from ethylene glycol, ethanolamine, ethylenediamine and their amides.

Another such cyclic example of an ester equivalent is

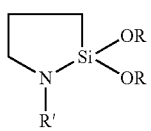

In this cyclic example R' is as defined in the preceding sentence except that it may not be aryl. 3-aminopropyl alkoxysilanes are well known to cyclize on heating and these RNHSi compounds would be useful in this invention. Preferably the amino-substituted organosilane ester or ester equivalent has ester groups such as methoxy that are easily volatilized as methanol. The amino-substituted organosilane must have at least one ester equivalent; for example, it may be a trialkoxysilane.

For example, the amino-substituted organosilane may have the formula (Z$_2$N-L-SiX'X"X'"), wherein Z is hydrogen, alkyl, or substituted aryl or alkyl including amino-substituted alkyl; and L is a divalent straight chain C1-12 alkylene or may comprise a C3-8 cycloalkylene, 3-8 membered ring heterocycloalkylene, C2-12 alkenylene, C4-8 cycloalkenylene, 3-8 membered ring heterocycloalkenylene or heteroarylene unit; and each of X', X" and X'" is a C1-18 alkyl, halogen, C1-8 alkoxy, C1-8 alkylcarbonyloxy, or amino group, with the proviso that at least one of X', X", and X'" is a labile group. Further, any two or all of X', X" and X'" may be joined through a covalent bond. The amino group may be an alkylamino group.

L may be divalent aromatic or may be interrupted by one or more divalent aromatic groups or heteroatomic groups. The aromatic group may include a heteroaromatic. The heteroatom is preferably nitrogen, sulfur or oxygen. L is optionally substituted with C1-4 alkyl, C2-4 alkenyl, C2-4 alkynyl, C1-4 alkoxy, amino, C3-6 cycloalkyl, 3-6 membered heterocycloalkyl, monocyclic aryl, 5-6 membered ring heteroaryl, C1-4 alkylcarbonyloxy, C1-4 alkyloxycarbonyl, C1-4 alkylcarbonyl, formyl, C1-4 alkylcarbonylamino, or C1-4 aminocarbonyl. L is further optionally interrupted by —O—, —S—, —N(Rc)-, —N(Rc)-C(O)—, —N(Rc)-C(O)—O—, —O—C(O)—N(Rc)-, —N(Rc)-C(O)—N(Rd)-, —O—C(O)—, —C(O)—O—, or —O—C(O)—O—. Each of Rc and Rd, independently, is hydrogen, alkyl, alkenyl, alkynyl, alkoxyalkyl, aminoalkyl (primary, secondary or tertiary), or haloalkyl;

Examples of amino-substituted organosilanes include 3-aminopropyltrimethoxysilane (SILQUEST A-1110), 3-aminopropyltriethoxysilane (SILQUEST A-1100), 3-(2-aminoethyl)aminopropyltrimethoxysilane (SILQUEST A-1120), SILQUEST A-1130, (aminoethylaminomethyl) phenethyltrimethoxysilane, (aminoethylaminomethyl)-phenethyltriethoxysilane, N-(2-aminoethyl)-3-aminopropylmethyldimethoxysilane (SILQUEST A-2120), bis-(.gamma.-triethoxysilylpropyl)amine (SILQUEST A-1170), N-(2-aminoethyl)-3-aminopropyltributoxysilane, 6-(aminohexylaminopropyl)trimethoxysilane, 4-aminobutyltrimethoxysilane, 4-aminobutyltriethoxysilane, p-(2-amino ethyl)phenyltrimethoxysilane, 3-aminopropyltris(methoxyethoxyethoxy)silane, 3-aminopropylmethyldiethoxy-silane, oligomeric aminosilanes such as DYNASYLAN 1146, 3-(N-methylamino)propyltrimethoxysilane, N-(2-aminoethyl)-3-aminopropylmethyldimethoxysilane, N-(2-aminoethyl)-3-aminopropylmethyldiethoxysilane, N-(2-aminoethyl)-3-aminopropyltrimethoxysilane, N-(2-aminoethyl)-3-aminopropyltriethoxysilane, 3-aminopropylmethyldiethoxysilane, 3-aminopropylmethyldimethoxysilane, 3-aminopropyldimethylmethoxysilane, 3-aminopropyldimethylethoxysilane, and the following cyclic compounds:

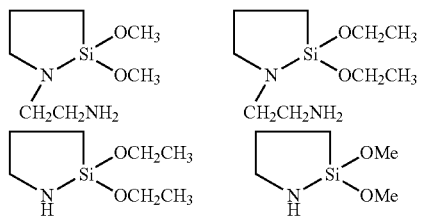

A bis-silyl urea [RO)$_3$Si(CH$_2$)NR]$_2$C=O is another example of an amino-substituted organosilane ester or ester equivalent.

In some embodiments, the alkoxy silane having amine functionality is 3-aminopropyltrimethoxysilane.

In some embodiments, the carboxylic acid functional silane compound is prepared by reacting a carboxylic acid anhydride with an alkoxy silane compound comprising a hydroxyl group, such as 3-hydroxyl propyl trimethoxy silane Upon reacting the previously described dicarboxylic acid or anhydride thereof with the acid reactive alkoxy silane compounds, the resulting alkoxy silane compound typically has the general formula:

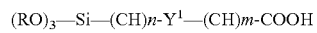

(RO)$_3$—Si—(CH)$n$-Y$^1$—(CH)$m$-COOH wherein R is a C$_1$-C$_4$ alkyl group and n is 2 or 3, m ranges from 1-12 (as previously described with respect to the dicarboxylic acid and anhydride thereof), and Y$^1$ is amide or ester.

One representative compound is depicted as follows:

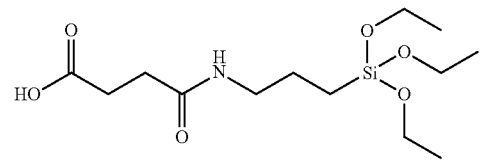

The coating composition is typically acidic having a pH less than 5.0, 4.5. 4.0, or 3.5. The pH of the coating composition is typically at least 1, 1.5 or 2.

The coating composition typically contains an acid having a pKa (H$_2$O) of ≤3.5, preferably <2.5, most preferably less than 1. Useful acids include H$_2$SO$_3$, H$_3$PO$_4$, CF$_3$CO$_2$H, HCl, HBr, HI, HBrO$_3$, HNO$_3$, HClO$_4$, H$_2$SO$_4$, CH$_3$SO$_3$H, CF$_3$SO$_3$H, and CH$_3$SO$_2$OH. Preferred acids include HCl, HNO$_3$, H$_2$SO$_4$, and H$_3$PO$_4$. The coating composition generally contains sufficient acid to provide a pH of less than 5, preferably less than 4. Generally, the coating composition is a solution containing an acid having a pKa (H$_2$O) of ≤3.5, preferably <2.5, most preferably less than 1. Nanoparticle coating compositions utilizing such acids are described in PCT Patent Publication No. WO 2009/140482, incorporated herein in its entirety.

The coating composition further comprises (e.g. silica) nanoparticles. The silica nanoparticles are typically dispersions of submicron size silica nanoparticles in an aqueous mixture. Exemplary commercially available silica nanoparticles include, for example, nonporous spherical silica nanoparticles in aqueous media (sols). For example, products under the trade designations LUDOX from WR Grace and Company of Columbia, Md., NYACOL from Nyacol Co. of Ashland, Mass., or NALCO from Nalco Co. of Naperville, Ill.

The nanoparticles are typically nominally spherical meaning a three dimensional shape having a circular cross-section and all points on its surface are about equidistance from its center.

The coating composition comprises a first set of spherical nanoparticles having an (e.g. unagglomerated and unaggregated) volume average primary particle diameter less than 20, 15, or 10 nanometers. In some embodiments, the average primary particle diameter is at least 1, 1.5, or 2 nm. The average particle size may be determined using transmission electron microscopy.

One silica sol with a volume average particle size of 5 nm, a pH of 10.5, and a nominal solids content of 15 percent by weight, is available as NALCO 2326 from Nalco Co. Other useful commercially available silica sols include those available as NALCO 1115 (4 nm), NALCO 1130 (8-9 nm) and NALCO 8699 (2 nm) from Nalco Co., as REMASOL SP30 (8-9 nm) from Remet Corp. of Utica, N.Y., and as LUDOX SM (7 nm) from WR Grace.

Without intending to be bound by theory, it is believed that silanol groups (—Si—OH) on the surface of the small silica nanoparticles react (condense) with silanol groups on the glass surface over a period of time while the coating composition still contains water. This can produce a glass surface containing bonded silica nanoparticles, that is, nanoparticles that are attached to the glass substrate by a chemical bond (a Si—O—Si bond). Such bonding is different than and more durable than adhesion by, for example, van der Waals forces. The number of small nanoparticles bonded to the glass substrate may be less than one monolayer of nanoparticles, that is, a sub-monolayer. Preferably, the small nanoparticles are at least 1% by weight of the coating composition. Without being bound by theory, the inventors believe that the bonded small silica nanoparticles on the glass surface act to reduce the receding contact angle of the very thin liquid films that are produced in subsequent steps, reducing de-wetting and enabling the formation of uniform very thin coatings. Additional chemical bonds maybe be formed via hydrolysis of the hydrolysable groups on the silane.

In some embodiments, larger silica particles are also included in the coating composition. These larger silica particles generally have an average primary particle size of at least 20, 30, 40, 50, 60, or 70 nanometers, and typically no greater than 200, 150, or 100 nm.

One silica sol with a volume average particle size of 45 nm and a nominal solids content of 40%, is available as NALCO DVSZN004 from Nalco Co. Other useful commercially available silica sols include those available as NALCO 2329 (75 nm) and NALCO 1050 (20 nm) from Nalco Co. and LUDOX™ (22 nm) available from WR Grace.

In typical embodiments, the smaller silica nanoparticles (i.e. less than 20 nm) are present in a greater amount than the larger silica nanoparticles. The weight ratio of smaller silica nanoparticles (i.e. less than 20 nm) to larger silica nanoparticles is typically at least 1.5:1 or 1.75:1 or 2:1. In some embodiments, the weight ratio is no greater than 4:1 or 3.5:1 or 3:1.

Generally the total weight of silica particles (i.e. smaller and larger silica particles) in the composition is at least 0.25, 0.5, 1.5, 2 wt.-% and typically no greater than 10 wt.-%, preferably 1 to 10 wt.-%, most preferably 2 to 7 wt.-%.

Coating compositions according to the present disclosure may be made by any suitable mixing technique. One useful technique includes combining alkaline spherical silica sols of appropriate particle size with water, adding acid to adjust the pH to the desired level, and then adding the alkoxy silane compound described herein. It may be useful to separately premix some components in one container and other components in another container, and to mix them immediately prior to use. It may be useful to mix some or all components from 1 to 60 hours prior to use.

The coating composition typically comprises at least 0.1, 0.2, 0.3, 0.4 or 0.5 wt.-% of the epoxy functional alkoxy silane compound and/or carboxylic acid functional alkoxy silane compound as described herein in the aqueous coating composition. The amount of epoxy functional alkoxy silane compound and/or carboxylic acid functional alkoxy silane compound is typically no greater than 5 wt.-% of the aqueous coating composition Preferably, the coating composition includes less than 2%, 1%, 0.5%, or 0.1% by weight, (based on the total weight of the liquid) of additives such as detergents, surfactants, leveling agents, colorants, dyes, perfumes, organic polymeric binders or materials that can act as oxidizers, oxidative catalysts or oxidative photocatalysts. Inclusion of such can reduce the effectiveness as an anti-soiling coating.

The method of making an anti-soiling article generally comprises providing a dried coating on a substrate.

The coating may be applied by various methods such as, for example, rolling, flooding, or submersion (e.g. dip coating).

The coating can be dried at room temperature or at elevated temperatures ranging up to about 160° C. However, the coatings are typically not exposed to temperatures that would volatize the organic group of the alkoxy silane compound.

The dried coating typically has an average thickness of at least 0.5, 1, 2, 3, 4, or 5 nm and no greater than 100, 75, or 50 nm.

The acidified aqueous coating compositions can be coated directly onto a substrate. In some embodiments, the substrate comprises an inorganic material, such as a metal oxide (e.g. silica). A particularly suitable substrate is a silica-containing glass, for example, soda-lime glass, low-iron soda-lime glass, borosilicate glass, and many other silica-containing glasses.

In some embodiments, the silica-containing glass may be a cover glass of a photovoltaic module or in other words a solar panel that converts solar energy to electrical energy The coated substrate derived from the coating composition is typically hydrophilic. The coated substrate may be sufficiently hydrophilic that a water drop applied to the surface immediately spreads on the surface and it may spread so rapidly and over such a large area, that it is difficult or impossible to measure the so-called contact angle. When contact angles are almost zero degrees or immeasurable, the surface is often described as "superhydrophilic." Superhydrophilic surfaces may resist the accumulation of dry dust. However, the property of superhydrophilicity alone is not sufficient to provide for easy removal of concentrated or compacted soil produced from soil-water slurries. Without intending to be bound by theory, enhancing the retention of a very thin layer of water and/or enhancing the mobility of a very small amount of water on the surface will provide for easy removal of concentrated or compacted soil. The water layer may be only a monolayer or a few monolayers thick and thus very difficult to observe by known analytical techniques.

The coated substrate (e.g. glass) has lower surface resistivity to the uncoated substrate (e.g. glass). In some embodiments, the surface resistivity of the uncoated substrate (e.g. glass) is $10^{14}$ ohms/sq; whereas the surface resistivity of the coated substrate (e.g. glass) is at least $10^7$, $10^8$, or $10^9$ ohms/sq. The transmittance of the coated substrate (e.g. glass) is at least 90%, 91%, 92%, 93%, 94% and in some embodiments at least 95%, 96%, or 97% before and after dry dust testing. The haze of the coated substrate (e.g. glass) before and after dry dust testing is typically less than 4%, 3%, or 2% and in some embodiments less than 1.5% or less than 1% haze. In some embodiments, the Gloss Loss % of the coated surface after dry dust testing is no greater than 30%, 25%, or 20% at an angle of 20 degrees. In some embodiments, the Gloss Loss % of the coated surface after dry dust testing is no greater than about 30% at an angle of 60 degrees. In some embodiments, the Gloss Loss % of the coated surface after dry dust testing is no greater than about 60% at an angle of 85 degrees.

Objects and advantages of this disclosure are further illustrated by the following non-limiting examples, but the particular materials and amounts thereof recited in these examples, as well as other conditions and details, should not be construed to unduly limit this disclosure.

Materials

Synthesis of 4-oxo-4-[[3-(triethoxysilyl)propyl]amino]-butanoic Acid (OTESPABA)

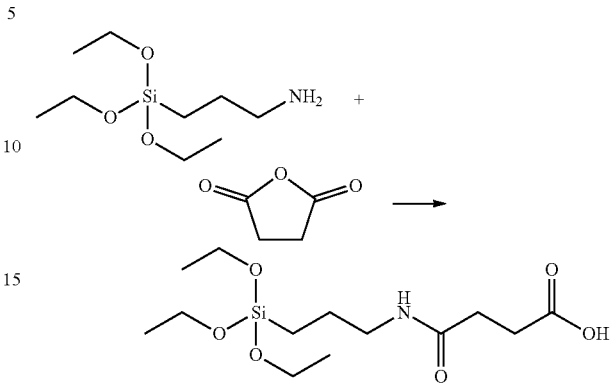

In a 250 mL round-bottom flask, 5.00 g (50 mmol) of succinic anhydride was dissolved in 80 mL of ethyl acetate. At room temperature (R.T.), 11.07 g (50 mmol) of 3-aminopropyltriethoxysilane in 50 mL of ethyl acetate were added dropwise. The solution was stirred for 4 h and then filtered to remove the white solids. After the evaporation of the ethyl acetate by a rotary evaporator, a light yellow oil was obtained and characterized by FTIR and $^1$H NMR confirming that the product indicated above was obtained.

General Procedure for Nanosilica Coating Solution Preparation

Nitric acid was diluted with deionized (DI) water to about 13.3 wt.-%. Into a 250 ml glass bottle were added 19.35 g of NALCO 8699 and 14.00 g of NALCO 1050. The solution was vigorously stirred for 30 minutes after 163.42 g of DI water was added until well mixed. 3.23 g of diluted $HNO_3$ was then added dropwise into the solution to adjust the final pH to 2-3, followed by a continuous agitation at R.T. for 1 hour. The resulting coating solution of spherical silica nanoparticles had 2 nm: 20 nm diameter weight ratio of 3:7.

TABLE 1

| Material | Description |
| --- | --- |
| NALCO 8699 | Colloidal spherical silica nanoparticle dispersion, 15-16 wt.-% solids, 2 nm average particle size, obtained from Nalco Co., Naperville, Illinois |
| NALCO 1050 | Colloidal spherical silica nanoparticle dispersion, 50 wt.-% solids, 20 nm average particle size, obtained from Nalco Co., Naperville, Illinois |
| NALCO 2329 | Colloidal spherical silica nanoparticle dispersion, 40 wt.-% solids, 75 nm average particle size, obtained from Nalco Co., Naperville, Illinois |
| Nissan SNOWTEX-OUP | Colloidal nonspherical silica nanoparticle dispersion, 15-16 wt.-% solids, 9-15 nm in diameter and 40-300 in length, obtained from Nissan Chemical Industries, Tokyo, Japan |
| OTESPABA | 4-oxo-4-[[3-(triethoxysilyl)propyl]amino]-butanoic acid, prepared as described below |
| GPTMS | γ-Glycidoxypropyltrimethoxysilane, obtained from Sinopharm Chemical Reagent Company, Shanghai, China |
| $HNO_3$ | Nitric acid, 65-68% purity, obtained from Sinopharm Chemical Reagent Company, Shanghai, China |
| $H_3PO_4$ | Phosphoric acid, 85% purity, obtained from Sinopharm Chemical Reagent Company, Shanghai, China |
| Glass panel | 180 mm × 100 mm × 3 mm glass panel, obtained from Jinqia Trading Co. Ltd, Shanghai, China |
| Mirror | 100 mm × 100 mm × 3 mm glass mirror, obtained from Jinqia Trading Co. Ltd., Shanghai, China |

Specific amounts of 4-oxo-4-[[3-(triethoxysilyl)propyl]amino]-butanoic acid (OTESPABA) and/or γ-Glycidoxypropyltrimethoxysilane (GPTMS) was slowly dropped into to the above solution as the last step after pH was fixed between 2 and 3, followed by stirring at R.T. for 2 hours.

General Coating Procedure

Glass panels (180 mm×100 mm×3 mm) or mirrors (100 mm×100 mm×3 mm) were cleaned with a liquefied detergent (White Cat brand, commercially available from Shanghai Hehuang White Cat Ltd. Shanghai, China), and then rinsed clean with DI water, and subsequently blow-dried with compressed air.

The panels were then coated using either by dip coating or roller coating, as described below.

Dip Coating 200 g of the coating solution described above was poured into a 400 ml stainless steel tank (150 mm×150 mm×20 mm). A glass panel or a mirror was then dip-coated in the solution by a dip coater (SKVDX2S-500, commercially available from KSV NIMA Company, Espoo, Finland) at R.T. The immersing and withdrawing speed of the dip coating process was fixed at 100 mm/min with immersion time of 1 min. The dip-coated glass panel or mirror was thermally treated in an oven of 120° C. for 5 mins or laid at R.T. for 24 hours.

Test Methods

Surface Resistivity Test

Surface resistivity (S.R.) measurements were carried out at 23° C., RH=50% by a Resistivity Meter (ACL-385, commercially available from ACL Staticide, Inc, Chicago, Ill.) according to ASTM D257-14. The sample was placed horizontally on a table with the side to be tested facing up. The two parallel electrodes from the meter were urged against the test surface to determine surface resistivity. The average of the five measurements was reported.

Dry Dust Test

The samples (uncoated, half-coated or fully-coated glass panels) were exposed to Arizona Test Dust (0~70 μm, commercially available from Powder Technology, Inc., Arden Hills, Minn.) maintained at 10% relative humidity. The samples were placed into about 1000 g of fresh Arizona Test Dust in a horizontal position in a polypropylene snap-top container (Ultra-Seal™, length 23.2 cm, width 16.8 cm, height 6.4 cm, 1.4 L capacity, commercially available from Sterilite Co., Townsend, Mass.) with the side to be tested facing up. The container was closed. The assembly was then tipped gently back and forth for 1 min with a fixed frequency of 1 tip per second so that the dust moved across the surface of the sample. The lid was then removed, and the sample was taken out of the dust and tapped once gently. Transmittance and haze were measured according to the following test method before and after the dry dust test.

Transmittance and Haze Measurement

Transmittance and haze measurements were performed with a Transparency Meter (BYK HAZE-GARD PLUS, commercially available from BYK-Gardner Co, Columbia, Md.) according to ASTM D1003-13. Five measurements were made on different areas of each sample surface, and the average of the five measurements was reported.

ΔT=Initial transmittance—Exposed transmittance
ΔH=Exposed haze—Initial haze

Gloss Measurement

Gloss measurements were performed with a Gloss Meter (BYK micro-Tri-Gloss, commercially available from BYK-Gardner Co., Columbia, Md.) which measured gloss at angles of 20°, 60° and 85° simultaneously. Unless otherwise noted, three measurements were made at each angle on each sample, and the average of the three measurements was reported. For ease of comparison, the loss of gloss over a period of outdoor performance testing was calculated as Gloss Loss %=(Initial gloss−Exposed gloss)/(Initial gloss)× 100%. A larger number for Gloss Loss % means that more soil has accumulated.

Examples 1-8 and Control Examples A and B: Spherical Silica Nanoparticle Combinations of 2/20 nm and 2/75 nm with OTESPABA The anti-soiling coating sample was made by dip coating (at a rate of 100 mm/min) half of a piece of a glass panel on both sides. The Ex. 1-8 solutions were prepared by following the detailed procedure above but with different weight ratios of OTESPABA. Two pieces of glass panels half-coated by the same compositions silica nanoparticle composition without OTESPABA on both sides was selected as Control Example A and Control Example B, respectively. The coating solution compositions were described in Table 4. Each coating was dried and cured at R.T. for 24 hours. The dry dust repellence was evaluated by measuring transmittance and haze before and after dry dust test. The test results were shown in Table 4.

TABLE 4

| | Coating solution | | | | | Transmittance % | | | Haze/% | | |
|---|---|---|---|---|---|---|---|---|---|---|---|
| Ex. | Silica 1 | Silica 2 | Silica ratio* | OTESPABA wt.-%** | S.R. Ω/sq | Initial | Exposed | ΔT | Initial | Exposed | ΔH |
| 1 | NALCO8699 | NALCO | 7:3 | 0.5 wt.-% | $10^7$ | 97.9 | 97.4 | 0.5 | 0.27 | 1.29 | 1.02 |
| 2 | (2 nm) | 1050 | | 1.0 wt.-% | $10^7$ | 97.8 | 97.4 | 0.4 | 0.30 | 1.31 | 1.01 |
| 3 | | (20 nm) | | 2.0 wt.-% | $10^7$ | 96.7 | 96.1 | 0.6 | 0.23 | 1.40 | 1.17 |
| 4 | | | | 3.0 wt.-% | $10^9$ | 94.1 | 93.8 | 0.3 | 0.44 | 1.64 | 1.20 |
| Control A | | | | 0 wt.-% | $10^7$ | 96.0 | 95.1 | 0.9 | 0.24 | 2.36 | 2.12 |
| 5 | NALCO | NALCO | 7:3 | 0.5 wt.-% | $10^7$ | 97.0 | 97.0 | 0.0 | 1.62 | 3.43 | 1.81 |
| 6 | 8699 | 2329 | | 1.0 wt.-% | $10^7$ | 97.1 | 97.0 | 0.1 | 1.75 | 3.16 | 1.41 |
| 7 | (2 nm) | (75 nm) | | 2.0 wt.-% | $10^7$ | 95.9 | 95.0 | 0.9 | 1.50 | 2.69 | 1.19 |
| 8 | | | | 3.0 wt.-% | $10^9$ | 95.7 | 94.5 | 1.2 | 1.82 | 2.95 | 1.13 |
| Control B | | | | 0 wt.-% | $10^7$ | 94.6 | 94.5 | 0.1 | 1.77 | 4.31 | 2.54 |
| Blank a | — | — | | | | 92.6 | 87.0 | 5.6 | 0.16 | 35.8 | 35.64 |
| Blank b | — | — | | | | 92.6 | 87.6 | 5.0 | 0.14 | 34.1 | 33.96 |
| Blank c | — | — | | | | 92.6 | 88.1 | 4.5 | 0.12 | 28.7 | 28.58 |

*Silica ratio = Silica 1:Silica 2 weight ratio in total solids of 5 wt.-% of the solution
**OTESPABA wt.-% of the solution Examples 9-16 and Control Examples C and D:
Spherical Silica Nanoparticle Combinations of 2/20 nm and 2/75 nm with GPTMS The anti-soiling coating sample was made by dip coating (at a rate of 100 mm/min) half of a piece of a glass panel on both sides. The Example 9-16 solutions were prepared by following the detailed procedure above but with different weight ratios of GPTMS. Two pieces of glass panels half-coated by the same compositions of nanosilica combinations of 2/20 nm and 2/75 nm without GPTMS on both sides was selected as Control Example C and Control Example D, respectively. The coating solution compositions were described in Table 5. Each coating was dried and cured at R.T. for 24 hours. The dry dust repellence was evaluated by measuring transmittance and haze before and after dry dust test. The test results were shown in Table 5.

TABLE 5

| | Coating solution | | | | | Transmittance % | | | Haze/% | | |
|---|---|---|---|---|---|---|---|---|---|---|---|
| Ex. | Silica 1 | Silica 2 | Silica ratio* | GPTMS wt.-%** | S.R. $\Omega$/sq | Initial | Exposed | $\Delta T$ | Initial | Exposed | $\Delta H$ |
| 9 | NALCO | NALCO | 7:3 | 0.5 wt.-% | $10^7$ | 97.7 | 96.4 | 1.3 | 0.22 | 1.63 | 1.41 |
| 10 | 8699 | 1050 | | 1.0 wt.-% | $10^7$ | 97.2 | 96.7 | 0.5 | 0.25 | 1.27 | 1.03 |
| 11 | (2 nm) | (20 nm) | | 2.0 wt.-% | $10^8$ | 97.1 | 97.0 | 0.1 | 0.49 | 1.32 | 0.83 |
| 12 | | | | 3.0 wt.-% | $10^9$ | 94.2 | 93.8 | 0.4 | 0.60 | 1.25 | 0.65 |
| Control C | | | | 0 wt.-% | $10^7$ | 95.8 | 95.2 | 0.7 | 0.26 | 2.42 | 2.16 |
| 13 | NALCO | NALCO | 7:3 | 0.5 wt.-% | $10^7$ | 96.6 | 95.7 | 0.8 | 1.78 | 3.89 | 2.11 |
| 14 | 8699 | 2329 | | 1.0 wt.-% | $10^7$ | 96.4 | 96.3 | 0.1 | 1.56 | 3.42 | 1.86 |
| 15 | (2 nm) | (75 nm) | | 2.0 wt.-% | $10^8$ | 96.4 | 96.2 | 0.2 | 1.22 | 3.37 | 2.15 |
| 16 | | | | 3.0 wt.-% | $10^9$ | 93.2 | 93.0 | 0.2 | 1.02 | 2.59 | 1.57 |
| Control D | | | | 0 wt.-% | $10^7$ | 94.6 | 94.3 | 0.3 | 2.34 | 4.99 | 2.65 |
| Blank d | — | | — | | | 92.6 | 88.0 | 4.6 | 0.17 | 30.5 | 30.33 |
| Blank e | — | | — | | | 92.6 | 87.2 | 5.4 | 0.17 | 37.6 | 37.43 |
| Blank f | — | | — | | | 92.6 | 89.0 | 3.6 | 0.19 | 33.4 | 33.21 |

*Silica ratio = Silica 1:Silica 2 weight ratio in total solid of 5 wt.-% of the solution
**GPTMS wt.-% of the solution Examples 17-24 and Control Examples E and F:
Spherical Silica Nanoparticle Combinations of 2/20 nm and 2/75 nm with OTESPABA/GPTMS for Outdoor Testing The anti-soiling coating sample was made by dip coating (at a rate of 100 mm/min) one whole side of a piece of a mirror. The Ex. 17-24 solutions were selected from Examples 2, 3, 10, 11, 6, 7, 14 and 15 solutions whose resulting coatings showed the higher transmittance and the lower haze increase simultaneously after the Dry Dust Test. The solution of Control Example E and Control Example F was from Control Example C and Control Example D, respectively. Each coating was dried and cured at R.T. for 24 hours. In addition, two pieces of blank mirrors have thoroughly been cleaned by following the detailed procedure above for comparison. These samples were prepared for outdoor performance testing so that initial surface resistivity, gloss at angles of 20°, 60° and 85° were tested before these samples were affixed to a support at a tilt angle of 30° to the horizontal direction. After exposure for one month, measurements of gloss at angles of 20°, 60° and 85° were again performed to evaluate the anti-soiling performance. The test results were shown in Table 6.

TABLE 6

| | Coating solution | | | | | Gloss | | | Gloss |
|---|---|---|---|---|---|---|---|---|---|
| Ex. | Silica 1 | Silica 2 | Silica ratio* | Alkoxy silane wt.-%** | S.R. $\Omega$/sq | Angle | Initial | Exposed | Loss % |
| 17 | NALCO 8699 (2 nm) | NALCO 1050 (20 nm) | 7:3 | 1.0 wt.-% OTESPABA | $10^9$ | 20° | 1681 | 1349 | 19.8 |
| | | | | | | 60° | 776 | 572 | 26.3 |
| | | | | | | 85° | 115.7 | 52.3 | 54.8 |
| 18 | | | | 2.0 wt.-% OTESPABA | $10^{10}$ | 20° | 1718 | 1377 | 19.8 |
| | | | | | | 60° | 805 | 586 | 27.2 |
| | | | | | | 85° | 120.0 | 50.3 | 58.1 |
| 19 | | | | 1.0 wt.-% GPTMS | $10^9$ | 20° | 1659 | 1298 | 21.8 |
| | | | | | | 60° | 770 | 555 | 27.9 |
| | | | | | | 85° | 116.0 | 48.7 | 58.0 |

TABLE 6-continued

| | Coating solution | | | | | Gloss | | Gloss |
|---|---|---|---|---|---|---|---|---|
| Ex. | Silica 1 | Silica 2 | Silica ratio* | Alkoxy silane wt.-%** | S.R. Ω/sq | Angle | Initial Exposed | Loss % |
| 20 | | | | 2.0 wt.-% GPTMS | $10^{10}$ | 20° | 1678 1311 | 21.9 |
| | | | | | | 60° | 772 556 | 28.0 |
| | | | | | | 85° | 119.0 48.4 | 59.3 |
| Control E | | | | 0 wt.-% | $10^8$ | 20° | 1669 1291 | 22.6 |
| | | | | | | 60° | 764 557 | 27.1 |
| | | | | | | 85° | 117.7 50.4 | 57.2 |
| 21 | NALCO 8699 (2 nm) | NALCO 2329 (75 nm) | 7:3 | 1.0 wt.-% OTESPABA | $10^9$ | 20° | 1655 1321 | 20.2 |
| | | | | | | 60° | 757 562 | 25.8 |
| | | | | | | 85° | 114.7 48.7 | 57.5 |
| 22 | | | | 2.0 wt.-% OTESPABA | $10^{11}$ | 20° | 1640 1231 | 24.9 |
| | | | | | | 60° | 734 491 | 33.1 |
| | | | | | | 85° | 112.7 38.5 | 65.8 |
| 23 | | | | 1.0 wt.-% GPTMS | $10^9$ | 20° | 1694 1341 | 20.8 |
| | | | | | | 60° | 786 562 | 28.5 |
| | | | | | | 85° | 117.0 47.6 | 59.3 |
| 24 | | | | 2.0 wt.-% GPTMS | $10^{10}$ | 20° | 1672 1187 | 29.0 |
| | | | | | | 60° | 762 497 | 34.8 |
| | | | | | | 85° | 117.7 39.8 | 66.2 |
| Control F | | | | 0 wt.-% | $10^8$ | 20° | 1653 1253 | 24.2 |
| | | | | | | 60° | 756 533 | 29.5 |
| | | | | | | 85° | 116.7 46.9 | 59.8 |
| Blank g | — | — | | | | 20° | 1721 1192 | 30.7 |
| | | | | | | 60° | 806 482 | 40.2 |
| | | | | | | 85° | 121.0 33.4 | 72.4 |
| Blank h | — | — | | | | 20° | 1671 1156 | 30.8 |
| | | | | | | 60° | 769 468 | 39.1 |
| | | | | | | 85° | 119.0 31.8 | 73.3 |

*Silica ratio = Silica 1:Silica 2 weight ratio in total solid of 5 wt.-% of the solution
**Alkoxy silane wt.-% of the solution Examples 25-27 and Control Example A: Spherical Silica Nanoparticle Combinations of 2/20 nm with a Mixture of OTESPABA and GPTMS The anti-soiling coating sample was made by dip coating (at a rate of 100 mm/min) half of a piece of a glass panel on both sides. The Ex. 25-27 solutions were prepared by following the detailed procedure above. The solution contained 5 wt.-% of NALCO 8699 (2 nm) and NALCO 1050 (20 nm) at a total solid weight ratio of 7:3 but with different concentrations of OTESPABA and GPTMS. The coating solution compositions were described in Table 7. Each coating was dried and cured at R.T. for 24 hours. The dry dust repellence was evaluated by measuring transmittance and haze before and after dry dust test. The test results were shown in Table 7.

TABLE 7

| | Alkoxy silane | | | Transmittance/% | | | Haze/% | | |
|---|---|---|---|---|---|---|---|---|---|
| | OTESPABA wt.-%* | GPTMS wt.-%* | S.R. Ω/sq | Initial | Exposed | ΔT | Initial | Exposed | ΔH |
| 25 | 0.5 wt.-% | 0.5 wt.-% | $10^8$ | 96.6 | 95.9 | 0.7 | 0.49 | 1.28 | 0.79 |
| 26 | 0.5 wt.-% | 1.0 wt.-% | $10^8$ | 96.4 | 95.7 | 0.7 | 0.53 | 1.51 | 0.98 |
| 27 | 1.0 wt.-% | 0.5 wt.-% | $10^8$ | 96.4 | 95.8 | 0.6 | 0.50 | 1.30 | 0.80 |
| Control A | 0 wt.-% | 0 wt.-% | $10^7$ | 96.0 | 95.1 | 0.9 | 0.24 | 2.36 | 2.12 |
| Blank a | — | — | | 92.6 | 87.0 | 5.6 | 0.16 | 35.8 | 35.64 |
| Blank b | — | — | | 92.6 | 87.6 | 5.0 | 0.14 | 34.1 | 33.96 |
| Blank c | — | — | | 92.6 | 88.1 | 4.5 | 0.12 | 28.7 | 28.58 |

*OTESPABA or GPTMS wt.-% of the solution

Control Example G: A Combination of Spherical Silica Nanoparticle with GPTMS and Nonspherical Silica Nanoparticle Solution 1: Into a 250 ml glass bottle were added 29.03 g of NALCO 8699 and 69.37 g of DI water. The solution was vigorously stirred at R.T. for 15 mins. Concentrated $H_3PO_4$ was then added dropwise into the solution to adjust the pH value to 1-2, followed by a continuous agitation at R.T. for 1 hour. 1.60 g of GPTMS was slowly added to the solution. Then the solution was heated to 60° C. and kept reaction for 10 hours.

Solution 2: Into another 250 ml glass bottle were added 35.48 g of Nissan SNOWTEX-OUP and 64.52 g of DI water. The solution was vigorously stirred at R.T. for 15 mins.

The coating solution was prepared by mixing Solution 1 and Solution 2 and then stirring at R.T. for 1 hour.

The anti-soiling coating sample was made by dip coating (at a rate of 100 mm/min) half of a piece of a glass panel on both sides. The coating solution composition was described in Table 8. Each coating was dried and cured at R.T. for 24 hours. The dry dust repellence was evaluated by measuring transmittance and haze before and after dry dust test. The test results were shown in Table 8.

TABLE 8

| | Coating solution | | | | | Transmittance % | | | Haze/% | | |
|---|---|---|---|---|---|---|---|---|---|---|---|
| Ex. | Spherical silica | Nonspherical silica | Silica ratio* | GPTMS wt.-%** | S.R. Ω/sq | Initial | Exposed | ΔT | Initial | Exposed | ΔH |
| Control G | NALCO 8699 | Nissan SNOWTEX-OUP | 4.5:5.5 | 0.8 wt.-% | $10^7$ | 95.8 | 95.3 | 0.5 | 0.56 | 4.57 | 4.01 |

*Silica ratio = Spherical silica:Nonspherical silica weight ratio in total solid of 5 wt.-% of the solution
**GPTMS wt.-% of the solution

What is claimed is:

1. A coated article comprising a substrate and a dried coating comprising:
   a first set of spherical silica nanoparticles having an average diameter of less than 20 nm;
   a second set of spherical silica nanoparticles having an average diameter of 20 nm to 120 nm; and
   an alkoxy silane compound comprising an epoxy functional group or a carboxylic acid functional group with the proviso that the compound is not the conjugate acid of carboxyethylsilane triol sodium salt or N-(trimethoxysilylpropyl)ethylene diamine triacetic acid trisodium salt, wherein the alkoxy silane compound is a carboxylic acid compound prepared by reacting a dicarboxylic acid or anhydride thereof with an acid reactive alkoxy silane compound.

2. The coated article of claim 1 wherein the acid reactive alkoxy silane is an amine-functional or hydroxyl-functional alkoxy silane compound.

3. The coated article of claim 1 wherein the alkoxy silane compound is free of ethylenic unsaturation.

4. The coated article of claim 3 wherein the alkoxy silane compound has the general formula:

$(RO)_3$—Si—$(CH)n$-$Y^1$—$(CH)m$-COOH wherein
R is a $C_1$-$C_4$ alkyl group;
n is 2 or 3,
m ranges from 1-12, and
$Y^1$ is amide or ester.

5. The coated articles of claim 1 wherein the first set of spherical silica nanoparticles having an average diameter of less than 20 nm and second set of spherical silica nanoparticles having an average diameter of 20 nm to 120 nm are present in a weight ratio of at least 1.5 to 1.

6. The coated articles of claim 1 wherein the substrate is glass.

7. The coated articles of claim 1 wherein the article is a solar panel.

8. A coating composition comprising an acidic aqueous dispersion comprising
   a first set of spherical silica nanoparticles having an average diameter of less than 20 nm;
   a second set of spherical silica nanoparticles having an average diameter of 20 nm to 120 nm; and
   a silane compound selected from the group consisting of epoxy silane and a carboxylic acid compound prepared by reacting a carboxylic acid with an acid reactive silane compound with the proviso that the compound is not the conjugate acid of carboxyethylsilane triol sodium salt or N-(trimethoxysilylpropyl)ethylene diamine triacetic acid trisodium salt, wherein the alkoxy silane compound is a carboxylic acid compound prepared by reacting a dicarboxylic acid or anhydride thereof with an acid reactive alkoxy silane compound.

9. The coating composition of claim 8 wherein the coating composition has a pH of less than 4.

10. The coating composition of claim 8 wherein the acid reactive alkoxy silane is an amine-functional or hydroxyl-functional alkoxy silane compound.

11. The coating composition of claim 8 wherein the alkoxy silane compound is free of ethylenic unsaturation.

12. The coating composition of claim 11 wherein the alkoxy silane compound has the general formula:

$(RO)_3$—Si—$(CH)n$-$Y^1$—$(CH)m$-COOH wherein
R is a $C_1$-$C_4$ alkyl group;
n is 2 or 3,
m ranges from 1-12, and
$Y^1$ is amide or ester.

13. The coating composition of claim 8 wherein the first set of spherical silica nanoparticles having an average diameter of less than 20 nm and second set of spherical silica nanoparticles having an average diameter of 20 nm to 120 nm are present in a weight ratio of at least 1.5 to 1.

* * * * *